(12) United States Patent
Gürtler et al.

(10) Patent No.: US 7,026,428 B2
(45) Date of Patent: Apr. 11, 2006

(54) BLOCKED POLYISOCYANATES

(75) Inventors: Christoph Gürtler, Köln (DE); Jan Mazanek, Köln (DE); Joachim Petzoldt, Monheim (DE); Heino Müller, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 470 days.

(21) Appl. No.: 10/458,663

(22) Filed: Jun. 10, 2003

(65) Prior Publication Data

US 2003/0232953 A1 Dec. 18, 2003

(30) Foreign Application Priority Data

Jun. 17, 2002 (DE) ................ 102 26 924
Jun. 17, 2002 (DE) ................ 102 26 925
Jun. 17, 2002 (DE) ................ 102 26 926
Jun. 17, 2002 (DE) ................ 102 26 927
Jun. 17, 2002 (DE) ................ 102 26 931

(51) Int. Cl.
*C08G 18/81* (2006.01)

(52) U.S. Cl. ............................ 528/45; 528/44

(58) Field of Classification Search ............ 528/45, 528/44

See application file for complete search history.

(56) References Cited

U.S. PATENT DOCUMENTS

| 4,482,721 | A | * | 11/1984 | Wegner et al. ........... 548/266.2 |
| 4,495,229 | A |   | 1/1985  | Wolf et al. ............... 427/388.2 |
| 5,061,775 | A |   | 10/1991 | Schmalstieg et al. ......... 528/45 |
| 5,246,557 | A |   | 9/1993  | Hughes et al. ........... 204/181.4 |
| 5,294,665 | A | * | 3/1994  | Pedain et al. ............... 524/591 |
| 5,352,755 | A |   | 10/1994 | Hughes et al. ................ 528/45 |
| 5,455,297 | A | * | 10/1995 | Pedain et al. ............... 524/591 |
| 5,621,063 | A |   | 4/1997  | Wolf et al. .................... 528/45 |
| 5,986,033 | A | * | 11/1999 | Hughes et al. ................ 528/45 |
| 6,063,860 | A |   | 5/2000  | Rimmer et al. ............. 524/590 |
| 6,368,669 | B1 |  | 4/2002  | Hughes et al. ........... 427/385.5 |

* cited by examiner

*Primary Examiner*—Johann Richter
*Assistant Examiner*—Chukwuma Nwaonicha
(74) *Attorney, Agent, or Firm*—Joseph C. Gil; Thomas W. Roy

(57) ABSTRACT

The invention relates to aqueous and/or water-dilutable blocked polyisocyanates, their preparation and use in optionally self-crosslinking one-component systems.

10 Claims, No Drawings

BLOCKED POLYISOCYANATES

CROSS REFERENCE TO RELATED APPLICATION

The present patent application claims the right of priority under 35 U.S.C. § 119 (a)–(d) of German Patent Applications No. 10226927.0, 10226931.9, 10226926.2, 10226925.4 and 10226924.6, all filed Jun. 17, 2002.

BACKGROUND OF THE INVENTION

1. Field of the Invention

The invention relates to aqueous and/or water-dilutable blocked polyisocyanates, to their preparation and use in optionally self-crosslinking one-component systems.

2. Description of the Related Art

The use of blocking agents for the temporary protection of isocyanate groups has been known for a long time. Blocked polyisocyanates are used for preparing heat-curable 1K PU baking systems which are stable on storage at room temperature. The blocked polyisocyanates therein are mixed, for example, with hydroxyl-containing polyesters, polyacrylates, other polymers, and further constituents of paints and inks such as pigments, cosolvents or additives. Another way to obtain baking varnishes which are stable on storage at room temperature is to block some of the isocyanate groups of polymers containing both blocked isocyanates and hydroxyl groups.

The major compounds used for blocking polyisocyanates are ε-caprolactam, methyl ethyl ketoxime, malonates, secondary amines, and triazole and pyrazole derivatives, as described, for example, in EP-A 0 576 952, EP-A 0 566 953, EP-A 0 159 117, U.S. Pat. No. 4,482,721, WO 97/12924 or EP-A 0 744 423.

Secondary amine blocking agents are described in EP-A 0 096 210. Although the claims of that patent extend to aralkyl-substituted amines as blocking agents, their use is not disclosed in the examples. The use of such amines in aqueous systems is not known from EP-A 0 096 210.

Industrially, the most frequently used blocking agents for isocyanates are ε-caprolactam and butanone oxime. Whereas baking temperatures of around 160° C. are generally employed in the case of ε-caprolactam, blocked 1K baking varnishes for which butanone oxime has been used as the blocking agent can be baked even at temperatures 10–20° C. lower. Admittedly, in some coating systems, the desired level of properties is no longer attained at these baking temperatures. However, even these temperatures are occasionally regarded as being too high, so that there is a need for baking systems which crosslink completely even at lower temperatures.

SUMMARY OF THE INVENTION

It is an object of the present invention, therefore, to find blocked polyisocyanates which exhibit a lower crosslinking or baking temperature than polyisocyanates blocked with butanone oxime.

This object has been achieved with the blocked polyisocyanates of the invention and self-crosslinking one-component baking systems comprising them.

The present invention provides aqueous and/or water-dilutable blocked polyisocyanates and self-crosslinking 1K (one-component) baking systems based on polyurethane of the formula (I)

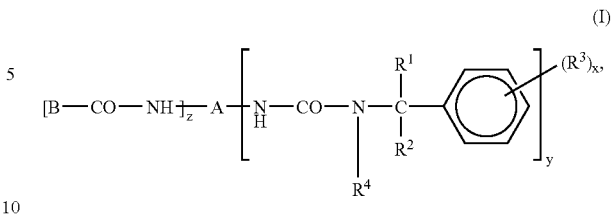

in which
A denotes the radical of a polyisocyanate,
B denotes the radical of a cationic, anionic and/or nonionic hydrophilicizing agent,
$R^1$, $R^2$ and $R^3$ may be identical or different and denote hydrogen, $C_1$–$C_4$-alkyl or $C_6$–$C_{10}$-cycloalkyl, preference being given to hydrogen,
$R^4$ denotes $C_1$–$C_4$-alkyl, $C_6$–$C_{10}$-cycloalkyl or $C_1$–$C_{14}$-aralkyl, preferably methyl, ethyl, isopropyl and tert-butyl, with particular preference tert-butyl,
x stands for the number 1, 2, 3, 4 or 5 and
y denotes a number from 1 to 8, preferably from 2 to 6, with particular preference from 2.5 to 4.0 and
z denotes a number from 0.1 to 4, preferably from 0.2 to 2;

the equivalents ratio of y to z being from 20:1 to 1:1, preferably from 10:3 to 3:1, with particular preference from 8:1 to 4:1.

The invention also provides a process for preparing the blocked polyisocyanates of the general formula (I), characterized in that polyisocyanates are reacted with secondary amines of the formula (II)

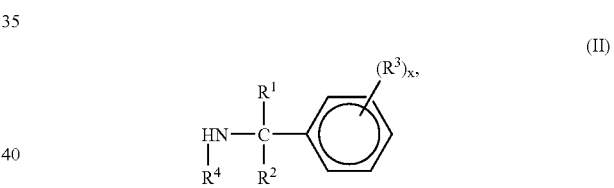

in which
$R^1$, $R^2$, $R^3$ and $R^4$ and x have the meanings specified for formula (I).

Particular preference is given to asymmetric substituted secondary amines, i.e. secondary amines having two different substituents.

The invention further provides for the use of the blocked polyisocyanates of the invention for preparing paints, inks and other baking systems such as adhesives or elastomers.

DETAILED DESCRIPTION OF THE INVENTION

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

Examples that may be mentioned of secondary amines according to the invention include the following: N-methyl-, N-ethyl-, N-(iso)propyl-, N-n-butyl-, N-isobutyl-, N-tertbutylbenzyl or 1,1-dimethylbenzylamine, N-alkyl-N-1,1-dimethylmethylphenylamine, adducts of benzylamine with compounds having activated double bonds such as malonates N,N-dimethylaminopropylbenzylamine and other optionally substituted benzylamines containing tertiary amino groups, and/or dibenzylamine. Naturally it is also possible to use mixtures of these amines with one another and/or with other blocking agent.

Suitable polyisocyanates for the purposes of the invention include all conventional hydrophilicized, aliphatic, cycloaliphatic and aromatic polyisocyanates having an isocyanate content of from 0.5 to 50%, preferably from 3 to 30%, with particular preference from 5 to 25% by weight such as tetramethylene diisocyanate, cyclohexane 1,3- and 1,4-diisocyanate, hexamethylene diisocyanate (HDI), 1-isocyanato-3,3,5-trimethyl-5-isocyanatomethylcyclohexane (isophorone diIsocyanate, IPDI), methylenebis(4-isocyanatocyclohexane), tetramethylxylylcne diisocyanate (TMXDI), triisocyanatononane.

Also suitable in principle are aromatic polyisocyanates such as tolylene diisocyanate (TDI), diphenylmethane 2,4'- and/or 4,4'-diisocyanate (MDI), triphenylmethane 4,4'-diisocyanate, naphthylene 1,5-diisocyanate.

Preferred suitability is possessed by polyisocyanates containing heteroatoms in the radical containing the isocyanate groups. Examples thereof are polyisocyanates containing carbodiimide groups, allophanate groups, isocyanurate groups, urethane groups and biuret groups.

Suitable with particular preference for the invention are the known polyisocyanates used principally in the production of paints, examples being modification products of the above mentioned simple polyisocyanates, in particular of hexamethylene diisocyanate or of isophorone diisocyanate, that contain biuret, isocyanurate or uretdione groups.

Also suitable are low molecular weight polyisocyanates containing urethane groups, as may be obtained by reacting IPDI or TDI employed in excess with simple polyhydric alcohols of the molecular weight range 62–300, in particular with trimethylolpropane or glycerol.

Suitable polyisocyanates are, furthermore, the known prepolymers containing terminal isocyanate groups, as are obtainable in particular by reacting the above mentioned simple polyisocyanates, especially diisocyanates, with substoichiometric amounts of organic compounds containing at least two isocyanate-reactive functional groups. In these known prepolymers the ratio of isocyanate groups to NCO-reactive hydrogen atoms is from 1.05:1 to 10:1, preferably from 1.1:1 to 3:1, the hydrogen atoms coming preferably from hydroxyl groups. The nature and proportions of the starting materials used in the preparation of NCO prepolymers are preferably chosen, moreover, so that the NCO prepolymers preferably have an average NCO functionality of from 2 to 3 and a number-average molar mass of 500–10 000, preferably 800–4000.

Further suitable polyisocyanaies for the purposes of the invention are those polyurethane-, polyester- and/or polyacrylate-based polymers containing free isocyanate groups, and optionally mixtures of such polymers, in which only some of the free isocyanate groups are reacted with the blocking agents of the invention while the remainder are reacted with an excess of hydroxyl-containing polyesters, polyurethanes and/or polyacrylates and also, where appropriate, mixtures thereof so as to give a polymer which contains free hydroxyl groups and which, on heating to suitable baking temperatures without addition of further isocyanate-reactive groups, undergoes crosslinking (self-crosslinking one-component baking systems).

Naturally, all the polyisocyanates mentioned may also be used as mixtures with one another or else with other crosslinkers such as with melamine resins for preparing paints, inks and other formulations.

The blocked polyisocyanates of the invention may be prepared by methods which are known per se. For example, one or more polyisocyanates may be introduced initially and the blocking agent may be metered in with stirring (over about 10 minutes, for example). Stirring is continued until free isocyanate is no longer detectable. It is also possible to block one or more polyisocyanates with a mixture of two or more blocking agents. Also possible, of course, is preparation in optionally water-miscible solvents, which where appropriate are removed again after preparation. It is, however, also possible to prepare the polyisocyanates of the invention in water-immiscible solvents and then to disperse these mixtures in water or to dilute them with water-miscible solvents such as acetone or N-methyl-pyrrolidone to give water-miscible solutions. In the preparation of the polyisocyanates of the invention it is also possible to use catalysts, cosolvents and other auxiliaries and additives.

An essential constituent of the preparation of the blocked polyisocyanates of the invention is their hydrophilicization, which results in the polyisocyanates thus prepared remaining in solution following the addition of water or else forming fine, sedimentation-stable dispersions.

As hydrophilicizing agents it is possible in this case to use all cationic, anionic and/or nonionic compounds suitable for this purpose, such as mono- and/or dihydroxycarboxylic acids or monofunctional alkyl ethoxylates. Naturally, mixtures of different hydrophilicizing agents can also be used.

The hydrophilicizing agents can be incorporated into the polyisocyanates of the invention by processes which are known per se. Thus, for example, first some of the isocyanate groups can be reacted with the blocking agents of the invention and then the remainder can be reacted with the hydrophilicizing agent. It is, however, also possible to reverse this procedure or else to proceed in such a way that the blocking of the isocyanate groups takes place in two steps, namely before and after the hydrophilicization.

Naturally, the hydrophilicizing agents can also be added at another point in time during the preparation of the polyisocyanates of the invention, such as during the preparation of the prepolymers, for example. As hydrophilicizing agents it is also possible, furthermore, to use hydrophilicized polyethers, polyesters and/or polyacrylates, such as are used, for example, in the preparation of self-crosslinking one-component baking varnishes.

Where mono- or dihydroxycarboxylic acids are used for hydrophilicization, this is followed by full or partial neutralization of the carboxyl groups. Neutralization can be carried out with any desired amines, such as triethyl-, dimethylcyclohexyl-, methyldiisopropyl- or dimethylethanolamine. Ammonia is also suitable.

The blocked polyisocyanates of the invention are used in the form of hydrophilicized aqueous and/or water-dilutable blocked polyisocyanates as crosslinkers preferably in a composition of:

a) 100 equivalent % of polyisocyanate b) 40–90, preferably 60–85, equivalent % of secondary benzylamine c) 10–40, preferably 10–30, with particular preference 10–25, equivalent % of a hydrophilicizing agent and optionally d) 0–40, preferably 5–25, equivalent % of a preferably difunctional hydroxyl- and/or amino-containing compound with an average molar weight of from 62 to 3000, preferably from 62 to 1500, the proportions of the reactants being chosen such that the equivalents ratio of NCO groups of component a) to isocyanate-reactive groups of components b), c) and d) is from 1:0.8 to 1:1.2, and also, where appropriate, adjuvants and auxiliaries.

Suitable difunctional chain extender components c) include, for example, diamines, diols and also hydroxyamines in the molecular weight range from 32 to 300. Examples are hydrazine, ethylenediamine, isophoronediamine, the bisketimine of isophoronediamine and methyl isobutyl ketone, 1,4-dihydroxy-butane, 1,6-hexanediol, ethanolamine, N-methylethanolamine, hydroxyethyl-ethylenediamine, the adduct of 2 mol of propylene carbonate and 1 mol of hydrazine of the formula (III) in question.

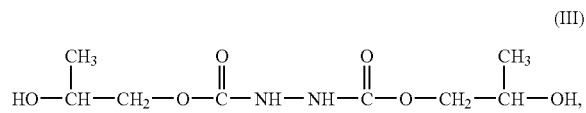

(III)

The aqueous and/or water-dilutable blocked polyisocyanates are either in the form of solutions in preferably water-miscible solvents such as N-methylpyrrolidone with a concentration of 40–95%, preferably 60–85% by weight or else in the form of fine dispersions having a solids content of 25–70%, preferably 35–50% by weight.

The polyisocyanates of the invention are, as described above, either self-crosslinking polymers or else crosslinkers for polyol components. Suitable polyol components, which may also be used as mixtures, include:

polyhydroxypolyesters, polyhydroxypolyethers or hydroxyl-containing polymers, for example the polyhydroxypolyacrylates known per se. The compounds generally have a hydroxyl number of from 20 to 200, preferably from 50 to 130, based on products in 100% form.

The polyhydroxylpolyacrylates are conventional copolymers of styrene with simple esters of acrylic acid and/or methacrylic acid, hydroxyl groups being introduced by the use of hydroxyalkyl esters, such as, for example, the 2-hydroxyethyl, 2-hydroxypropyl, 2-, 3- or 4-hydroxybutyl esters of these acids.

Suitable polyetherpolyols are the ethoxylation and/or propoxylation products, known per se from polyurethane chemistry, of suitable starter molecules with a functionality of 2 to 4, such as water, ethylene glycol, propanediol, trimethylol-propane, glycerol and/or pentaerythritol, for example.

Examples of suitable polyesterpolyols are, in particular, the reaction products, known per se in polyurethane chemistry, of polyhydric alcohols, for example alkanepolyols of the type just exemplified, with excess amounts of polycarboxylic acids or polycarboxylic anhydrides, especially dicarboxylic acids or dicarboxylic anhydrides. Examples of suitable polycarboxylic acids and polycarboxylic anhydrides are adipic acid, phthalic acid, isophthalic acid, phthalic anhydride, tetrahydrophthalic anhydride, hexahydrophthalic anhydride, maleic acid, maleic anhydride, the Diels-Alder adducts thereof with cyclopentadiene, fumaric acid or dimeric or trimeric fatty acids. In the preparation of the polyesterpolyols it is of course possible to use mixtures of the polyhydric alcohols exemplified or mixtures of the acids and acid anhydrides exemplified.

The polyesterpolyols are prepared by known methods, as described, for example, in Houben-Weyl, Methoden der organischen Chemie, volume XIV/2, G. Thieme-Verlag, 1963, pages 1 to 47. The hydrophilic modification of these polyhydroxyl compounds, which may be necessary, takes place in accordance with methods known per se, as disclosed, for example, in EP-A-0 157 291 or EP-A-0 427 028.

It is of course also possible to use mixtures or else reaction products based on polyesters, polyethers and polyacrylates, also modified where appropriate by polyurethanes of the known kind.

The blocked polyisocyanates of the invention are used for preparing baking varnishes, for the coating of substrates, preferably comprising metals, minerals, wood, plastics, for industrial coating and in automotive OEM finishing, for example. For these purposes the coating compositions of the invention may be applied by knifecoating, dipping, spray application such as compressed-air spraying or airless spraying, and also by electrostatic application, for example high-speed rotational bell application. The dry film thickness can be, for example, 10–120 μm. The dried film is cured by baking in the temperature range of 90–160° C., preferably 110–140° C., with particular preference 120–130° C.

The paints, inks and other formulations are prepared from the polyisocyanates of the invention by methods which are known per se.

Besides the polyisocyanates and polyols, customary additives and other auxiliaries (e.g. pigments, fillers, levelling agents, defoamers, catalysts) may be added to the formulations in amounts which are easy for the person skilled in the art to determine.

EXAMPLES

Particle sizes were determined by Larver correlation spectroscopy (LSC)

Example 1

Preparation of a Water-Dilutable Polyisocyanate Crosslinker 58.80 g (0.297 eq) of a commercial isocyanurate-containing paint polyisocyanate based on 1,6-diisocyanatohexane (HDI), having an NCO content of 21.4% by weight, a viscosity at 23° C. of about 3000 mPas and a functionality of about 3.5, 7.08 g (0.06 mol) of hydroxypivalic acid and 56.57 g of N-methylpyrrolidone were mixed with stirring and heated to 70° C. over 30 minutes. The mixture was stirred at this temperature for 2 hours and then the temperature was raised to 80° C. After a further 2 hours an NCO content of 7.60% was reached, the reaction mixture was cooled to 55° C. and then 36.24 g (0.222 mol) of benzyl-tert-butylamine were added over the course of 15 minutes, the temperature rising to 60° C.

Stirring was continued at 60° C. for 10 minutes and the completeness of the reaction was determined by IR spectrum. Subsequently, at 60° C., 5.35 g (0.06 mol) of dimethylethanolamine were added and stirring was continued for 10 minutes. This gave a clear solution of the blocked polyisocyanate having a solids content of 66.6% and a blocked NCO group content of 5.69%.

Example 2

Preparation of an Aqueous Dispersion of the Invention 58.80 g (0.297 eq) of a commercial isocyanurate-containing paint polyisocyanate based on 1,6-diisocyanatohexane (HDI), having an NCO content of 21.4% % by weight, a viscosity at 23° C. of about 3000 mPas and a functionality of about 3.5 were admixed with stirring at room temperature with 31.09 g (0.189 mol) of benzyl-tert-butylamine over the course of 20 minutes. During this time the temperature rose to 43° C., the NCO content of the reaction mixture reaching 5.04% (theoretically 5.07%). The reaction mixture was heated to 70° C. with stirring and then, over a total period of 30 minutes, the following were added in succession: 1.61 g (0.0135 mol) of 1,6-hexanediol and 6.42 g (0.054 mol) of hydroxypivalic acid, the latter in solution in 10.36 g of N-methylpyrrolidone. Stirring was continued at 70° C. for 2 hours, the NCO content reaching 0.5%. Then, at 70° C., 5.34 g (0.0594 mol) of dimethylethanolamine were added and stirring was continued for 15 minutes. Thereafter, 143.84 g of hot (70° C.) deionized water were added and dispersion was carried out at 70° C. for 1 hour. This produced a stable white dispersion have the following properties:

| | |
|---|---|
| Solids content: | 40% |
| pH: | 9.22 |
| Viscosity (23° C.): | 200 mPas |
| Average particle size (LCS): | 201 nm |

Example 3

Preparation of a Dispersion of the Invention 343.20 g (1.76 eq) of a commercial isocyanurate-containing paint polyisocyanate based on 1,6-diisocyanatohexane (HDI), having an NCO content of 21.4% by W weight, a viscosity at 23° C. of about 3000 mPas and a functionality of about 3.5, were heated to 70° C. with stirring and 9.45 g (0.08 g mol) of 1,6-hexanediol were added over the course of 10 minutes. Following the addition of a solution of 37.76 g (0.32 eq) of hydroxypivalic acid in 60.93 g of N-methylpyrrolidone (over the course of 10 minutes) the mixture was stirred at 70° C. for 4 hours. The NCO content of the reaction mixture was then 11.02%. Subsequently, at 70° C., 193.30 g (1.184 mol) of N-benzyl-tert-butylamine were added over the course of 60 minutes followed by stirring for 20 minutes. At that point NCO could no longer be found by IR spectroscopy. Over the course of 10 minutes, at 70° C., 31.38 g (0.352 mol) of dimethylethanolamine were added, the mixture was stirred for 10 minutes and then, with stirring, 861.7 g of hot (70° C.) deionized water were added followed by stirring at 70° C. for 1 hour. Cooling with stirring to room temperature gave a dispersion having the following properties:

| | |
|---|---|
| Solids content: | 40% |
| pH: | 9.41 |
| % blocked NCO: | 3.23% |
| Viscosity: | 300 mPas |
| Particle size (LCS): | 19 nm |

Example 3a

The procedure described in Example 3 was repeated but with dropwise addition of hydroxypivalic acid over the course of 3 hours and with the use as polyisocyanate of a 70% strength solution of the trimer of isophorone diisocyanate in methoxypropyl acetate/xylene (Desimodur® Z 4400 M/X, Bayer AG). The dispersion obtained had the following properties:

| | |
|---|---|
| Solids content: | 35% |
| pH: | 9.28 |
| Viscosity (23° C.): | 60 mPas |
| Particle size (LCS): | 85 nm |

Example 3b

The procedure of Example 3 was repeated but using as polyisocyanate a mixture of IPDI trimer and 4-isocyanatomethyl-1,8-octane diisocyanate (Desmodur® Z 4460 TIN, Bayer AG). The dispersion obtained had the following properties:

| | |
|---|---|
| Solids content: | 40% |
| pH: | 9.5 |
| Viscosity (23° C.): | 45 mPas |
| Particle size (LCS): | 255 nm |

Example 4

78.00 g (0.4 eq) of a commercial isocyanurate-containing paint polyisocyanate based on 1,6-diisocyanatohexane (HDI), having an NCO content of 21.4% % by weight, a viscosity at 23° C. of 3000 mPas and a functionality of about 3.5, were introduced with stirring at 70° C. and a solution of 4.72 g (0.04 mol) of hydroxypivalic acid and 1.34 g (0.01 mol) of dimethylolpropionic acid in 11.17 g of N-methylpyrrolidone was added over the course of 5 minutes. Following the addition of 4.00 g (0.008 mol) of Pluriol 500 (methyl oligoetbylene glycol, MW 500) and 1.18 g (0.02 mol) of 1,6 hexanediol, the mixture was stirred at 70° C. for 90 minutes. The NCO content was then 13.01% (theoretically 13.05%). At 70° C., 50.94 g (0.312 mol) of N-benzyl-tert-butylamine were added over the course of 20 minutes followed by stirring at 70° C. for 15 minutes. At that point no NCO groups could be detected by IR spectroscopy. At 70° C., 4.46 g (0.05 mol) of dimethylethanolamine were added followed by stirring for 10 minutes and then by the addition of 205.79 g of hot water at 50° C. Stirring was continued at 50° C. for 1 hour. The resulting bluish dispersion had the following properties:

| | |
|---|---|
| Solids content: | 40% |
| pH: | 9.7 |
| Viscosity (23° C.): | 2000 mPas |
| Particle size (LCS): | 37 nm |

Example 5

Preparation of a Dispersion

The procedure of Example 3 was repeated but using, instead of N-benzyl-tert-butylamine, a mixture of diisopropylamine and N-benzyl-tert-butylamine in a molar ratio of 2:1. The dispersion obtained had the following properties:

| | |
|---|---|
| Solids content: | 40% |
| pH: | 9.3 |
| Viscosity (23° C.): | 330 mPas |
| Particle size (LCS): | 24 nm |

Example 6

Preparation of a Dispersion of the Invention

The procedure of Example 4 was repeated but using, instead of N-benzyl-tert-butylamine, in mixture of diisopropylamine and N-benzyl-tert-butylamine in a molar ratio of 2:1. The dispersion obtained had the following properties:

| | |
|---|---|
| Solids content: | 40% |
| pH: | 9.75 |
| Viscosity (23° C.): | 850 mPas |
| Average particle size (LCS): | 23 nm |

Example 7

Comparative Example I

The procedure described in Example 2 was repeated but using butanone oxime instead of N-benzyl-tert-butylamine. The dispersion obtained had the following properties:

| | |
|---|---|
| Solids content: | 38% |
| pH: | 8.5 |
| Viscosity (23° C.): | 4000 mPas |
| Particle size (LCS): | 42 nm |

Example 8

Preparation of a Self-Crosslinking One-Component Baking System

A mixture of 337.5 g (3.035 eq) of isophorone duisocyanate, 18.02 g (0.2 mol) of 1,4-butanediol, 13.42 g (0.01 mol) of trimethylolpropane, 22.5 g (0.045 mol) of methanol ethoxylate of average molar weight 500 and 205.80 g (0.49 eq) of a polyester made from adipic acid and hexanediol with an average molar weight of 840 was admixed at 85° C. with 53.66 g (0.4 mol) of dimethylpropiomic acid in solution in 106.80 g of N-methylpyrrolidone, with stirring, and the reaction mixture was stirred at this temperature for 4 hours. The NCO content was then 4.78% (theoretically 4.80%). Over the course of 20 minutes 18.02 g (0.61 eq) of butanone oxime were added. Then 318.18 g (1 eq) of a polyester formed from adipic acid, isophthalic acid, trimethylolpropane, neopentyl glycol and propylene glycol were added and the reaction mixture was stirred at 85° C. for 10 hours. After that it was no longer possible to detect NCO groups by IR spectroscopy. Thereafter 35.57 g (0.4 mol) of dimethylethanolamine were added and stirring was continued for 10 minutes. Following the addition of 1525.5 g of hot (70° C.) deionized water, dispersion was carried out at 70° C. for 1 hour. The white dispersion obtained had the following properties:

| | |
|---|---|
| Solids content: | 40% |
| pH: | 8.15 |
| Viscosity (23° C.): | 4000 mPas |
| Particle size (LCS): | 47 nm |

Example 9

Comparative Example II

The procedure described in Example 8 was repeated but using butanone oxime instead of the blocking agent of the invention. The dispersion obtained had the following properties:

| | |
|---|---|
| Solids content: | 40% |
| pH: | 8.6 |
| Viscosity (23° C.): | 3800 mPas |
| Particle size (LCS): | 51 nm |

Examples

Use Examples

The examples below show the advantages of the blocked polyisocyanates of the invention over the state of the art.

Clearcoat materials were prepared with the following composition. The clearcoat materials were used to produce films, which were dried at room temperature for 10 minutes and then baked at 130° C. for 30 minutes. The films obtained were assessed for performance. The results are compiled in Table 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

TABLE 1

(NCO:OH = 1.0)

| | Polyisocyanate from Example No. | | | | | | | | |
|---|---|---|---|---|---|---|---|---|---|
| | 1 | 2 | 3 | 4 | 5 | 6 | 7 | 8 | 9 |
| Product (g) | | | | | | | | | |
| Bayhydrol ® PT 241[1)] | 20.1 | 20.1 | 20.1 | 20.1 | 20.1 | 20.1 | 20.1 | | |
| Bayhydrol ® VP LS 2290 | 54.9 | 54.9 | 54.9 | 54.9 | 54.9 | 54.9 | 54.9 | | |

TABLE 1-continued (NCO:OH = 1.0)

Polyisocyanate from Example No.

|  | 1 | 2 | 3 | 4 | 5 | 6 | 7 | 8 | 9 |
|---|---|---|---|---|---|---|---|---|---|
| Additol ® XW 395 sf | 1.2 | 1.3 | 1.2 | 1.2 | 1.2 | 1.1 | 1.1 | 1.1 | 1.1 |
| Surbynol ® 104, 50% in NMP | 1.2 | 1.3 | 1.2 | 1.2 | 1.2 | 1.1 | 1.1 | 1.1 | 1.1 |
| Distilled water | 66.0 | 7.0 | 17.0 | 13.0 | 18.0 | 15.0 | 17.0 | | |
| Polyisocyanate | 56.4 | 103.8 | 100.3 | 54.9 | 90.9 | 80.2 | 82.3 | 164.5 | 164.5 |
| Characteristic | | | | | | | | | |
| Pendulum hardness(s) | 198 | 200 | 198 | 199 | 194 | 175 | 103 | 108 | 72 |
| Incipient dissolubility (1 min.) | 1134 | 2234 | 2234 | 2244 | 3244 | 3244 | 3344 | 4444 | 4555 |
| Impact test | >80/>80 | 60/60 | >80/>80 | >80/>80 | <20/<20 | <20/<20 | <20/<20 | >80/>80 | <20/<20 |
| NaCl test 144 h (steel) | 5 mm | 6 mm | 9 mm | 8 mm | 14 mm | 16 mm | 22 mm | 9 mm | 23 mm |

[1])Bayer AG, Leverkusen
sf: supply form

What is claimed is:

1. Aqueous and/or water-dilutable blocked polyisocyanates of the formula (I)

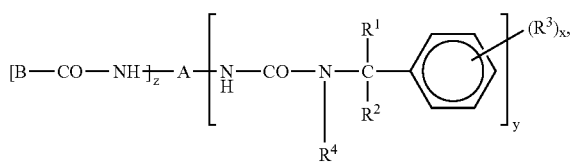

(I)

in which
A denotes the radical of a polyisocyanate,
B denotes the radical of a cationic, anionic and/or non-ionic hydrophilicizing agent,
$R^1$, $R^2$ and $R^3$ may be identical or different and denote hydrogen, $C_1$–$C_4$-alkyl or $C_6$–$C_{10}$-cycloalkyl,
$R^4$ denotes $C_1$–$C_4$-alkyl, $C_6$–$C_{10}$-cycloalkyl or $C_1$–$C_{14}$-aralkyl, and
x stands for the number 1, 2, 3, 4 or 5 and
y denotes a number from 1 to 8, and
z denotes a number from 0.1 to 4,
the equivalents ratio of y to z being from 20:1 to 1:1.

2. Blocked polyisocyanates according to claim 1, wherein N-benzyl-tert-butylamine is used as secondary amine.

3. Process for preparing the blocked polyisocyanates according to claim 1, wherein polyisocyanates are reacted with secondary amines of the general formula (II)

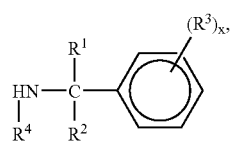

(II)

in which
$R^1$, $R^2$, $R^3$ and $R^4$ and x have the definition specified in claim 1 for formula (I).

4. Method for preparing one of a paint, an ink, an adhesive and an elastomer, comprising adding a blocked polyisocyanate according to claim 1 to a formulation.

5. Method according to claim 4 wherein the one of a paint, an ink, an adhesive and an elastomer is a baking system.

6. Method according to claim 4, wherein the one of a paint, an ink, an adhesive and an elastomer is a self-crosslinking system.

7. Method according to claim 4, wherein the one of a paint, an ink, an adhesive and an elastomer is a baking system for the coating of substances comprising wood, metals, minerals and plastics.

8. Hydrophilicized, aqueous and/or water-dilutable composition comprising blocked polyisocyanates according to claim 1, the composition comprising:
a) 100 equivalent % of polyisocyanate
b) 40–90 equivalent % of secondary benzylamine
c) 10–40 equivalent % of a hydrophilicizing agent,
the proportions of the reactants being chosen such that the equivalents ratio of NCO groups of component a) to isocyanate-reactive groups of components b) and c) is from 1:0.8 to 1:1.2.

9. Hydrophilicized, aqueous and/or water-dilutable composition comprising blocked polyisocyanates according to claim 1, the composition comprising:
a) 100 equivalent % of polyisocyanate
b) 60–85 equivalent % of secondary benzylamine
c) 10–25 equivalent % of a hydrophilicizing agent and
d) 0–40 equivalent % of a hydroxyl- and/or amino-containing compound with an average molar weight of from 62 to 3000,
the proportions of the reactants being chosen such that the equivalents ratio of NCO groups of component a) to isocyanate-reactive groups of components b), c) and d) is from 1:0.8 to 1:1.2.

10. The composition of claim 9, wherein the hydroxyl- and/or amino-containing compound is difunctional, present in an amount from 5–25 equivalent %, and has a molar weight from 62 to 1500, the composition also comprising adjuvants and auxiliaries.

* * * * *